US012496063B2

(12) United States Patent
Feng et al.

(10) Patent No.: US 12,496,063 B2
(45) Date of Patent: Dec. 16, 2025

(54) SURGICAL INSTRUMENT

(71) Applicant: Reach Surgical, Inc., Tianjin (CN)

(72) Inventors: Rongxuan Feng, Tianjin (CN); Kai Wang, Tianjin (CN); Yafei Jiang, Tianjin (CN)

(73) Assignee: Reach Surgical, Inc., Tianjin (CN)

( * ) Notice: Subject to any disclaimer, the term of this patent is extended or adjusted under 35 U.S.C. 154(b) by 0 days.

(21) Appl. No.: 18/783,066

(22) Filed: Jul. 24, 2024

(65) Prior Publication Data

US 2024/0398409 A1   Dec. 5, 2024

Related U.S. Application Data

(63) Continuation of application No. PCT/CN2023/072841, filed on Jan. 18, 2023.

(30) Foreign Application Priority Data

Jan. 25, 2022   (CN) .......................... 202210088344.7

(51) Int. Cl.
*A61B 17/072* (2006.01)
*A61B 17/068* (2006.01)

(52) U.S. Cl.
CPC .......... *A61B 17/072* (2013.01); *A61B 17/068* (2013.01); *A61B 17/07207* (2013.01);
(Continued)

(58) Field of Classification Search
CPC ................ A61B 17/068; A61B 17/072; A61B 17/07207; A61B 17/115; A61B 17/00234;
(Continued)

(56) References Cited

U.S. PATENT DOCUMENTS 8,020,743 B2 * 9/2011 Shelton, IV ..... A61B 17/07207
227/19
8,608,045 B2 * 12/2013 Smith .................... A61B 17/10
227/181.1
(Continued)

FOREIGN PATENT DOCUMENTS

CN    1644174 A    7/2005
CN    102973308 A    3/2013
(Continued)

OTHER PUBLICATIONS

International Search Report on PCT/CN2023/072841 dated May 9, 2023.
(Continued)

*Primary Examiner* — Scott A Smith
(74) *Attorney, Agent, or Firm* — Foley & Lardner LLP

(57) ABSTRACT

A surgical instrument includes a handle portion; an elongated shaft extending from the handle portion to a distal side; an end effector; and an joint assembly, a articulating mechanism and a lockout assembly, the lockout assembly comprises a first lock member and a second lock member, the first lock member is operated to selectively lock a bending operation of the articulating mechanism, and the first lock member is arranged to selectively lock the bending operation of the articulating mechanism under an operation of the articulating mechanism; and the second lock member is arranged to selectively lock a position of the joint assembly under an operation of the handle portion.

20 Claims, 13 Drawing Sheets

(52) U.S. Cl.
CPC .............. *A61B 2017/07214* (2013.01); *A61B 2017/07285* (2013.01)

(58) Field of Classification Search
CPC  A61B 2017/00473; A61B 2017/00477; A61B 2017/07214; A61B 2017/2927; A61B 2017/2943; A61B 34/30; A61B 34/71; A61B 34/76; A61B 90/98
USPC .............. 227/19, 175.1, 165.2, 176.1, 180.1; 606/1, 139, 219
See application file for complete search history.

(56) References Cited

U.S. PATENT DOCUMENTS

| | | | |
|---|---|---|---|
| 9,867,615 B2* | 1/2018 | Fanelli | A61B 17/07207 |
| 10,188,385 B2* | 1/2019 | Kerr | A61B 17/07207 |
| 10,492,785 B2* | 12/2019 | Overmyer | A61B 17/07207 |
| 11,197,671 B2* | 12/2021 | Shelton, IV | A61B 17/07207 |
| 11,246,592 B2* | 2/2022 | Shelton, IV | A61B 17/29 |
| 2007/0027468 A1* | 2/2007 | Wales | A61B 90/03 606/205 |
| 2007/0175956 A1* | 8/2007 | Swayze | A61B 34/76 227/19 |
| 2008/0041916 A1* | 2/2008 | Milliman | A61B 17/105 227/176.1 |
| 2009/0101692 A1* | 4/2009 | Whitman | A61B 90/98 227/175.1 |
| 2009/0206124 A1* | 8/2009 | Hall | A61B 17/068 227/175.1 |
| 2014/0052112 A1 | 2/2014 | Cappola | |
| 2014/0243801 A1* | 8/2014 | Fanelli | A61B 17/07207 606/1 |
| 2015/0374362 A1 | 12/2015 | Gettinger et al. | |
| 2016/0174976 A1* | 6/2016 | Morgan | A61B 17/072 227/175.1 |
| 2017/0224337 A1 | 8/2017 | Williams | |
| 2017/0340327 A1* | 11/2017 | Yang | A61B 17/07207 |
| 2018/0168581 A1* | 6/2018 | Hunter | A61B 17/07207 |
| 2018/0353179 A1 | 12/2018 | Shelton | |
| 2022/0000476 A1* | 1/2022 | Tang | A61B 17/072 |

FOREIGN PATENT DOCUMENTS

| | | |
|---|---|---|
| CN | 104546048 A | 4/2015 |
| CN | 105101884 A | 11/2015 |
| CN | 105496483 A | 4/2016 |
| CN | 106456178 A | 2/2017 |
| CN | 107771060 A | 3/2018 |
| CN | 108065978 | 5/2018 |
| CN | 108882936 A | 11/2018 |
| CN | 110831513 | 2/2020 |
| CN | 111134751 | 5/2020 |
| CN | 113208678 | 8/2021 |
| CN | 114224414 | 3/2022 |
| CN | 114305558 A | 4/2022 |
| CN | 217365963 | 9/2022 |
| EP | 2 505 143 A2 | 10/2012 |
| EP | 3 205 281 A1 | 8/2017 |
| JP | 2016-508417 A | 3/2016 |
| WO | WO-2014/133776 A1 | 9/2014 |
| WO | WO-2018/086046 A1 | 5/2018 |
| WO | WO-2020/261018 A1 | 12/2020 |

OTHER PUBLICATIONS

Extended European Search Report issued in EP Appl. No. 23746177.7 dated Jun. 25, 2025.
Office Action issued in Chinese Appl. No. 202210088344.7 dated Apr. 25, 2025.
Office Action issued in Japanese Appl. No. 2024-545017 dated Jun. 17, 2025.
Partial Supplementary European Search Report issued in EP Appl. No. 23746177.7 dated Apr. 3, 2025.
Novelty and Inventiveness Search Report issued in Chinese Appl. No. 202210088344.7 dated May 17, 2023.

* cited by examiner

SURGICAL INSTRUMENT

CROSS-REFERENCE TO RELATED PATENT APPLICATIONS

This application is a Continuation of International Application No. PCT/CN2023/072841, filed Jan. 18, 2023, which claims priority to and the benefit of Chinese Patent Application No. 202210088344.7, filed Jan. 25, 2022. International Application No. PCT/CN2023/072841 and Chinese Patent Application No. 202210088344.7 are incorporated herein by reference in their entireties, including their specifications, drawings, claims and abstracts.

BACKGROUND

The present application relates to the technical field of medical instruments, and particularly to a surgical instrument.

In the related art, surgical instruments are usually used in soft tissues, such as a surgical stapler, which reduces or eliminates bleeding from the soft tissues in a process of tissue cutting. The surgical stapler is provided with an end effector and an articulation manipulation mechanism for articulating the end effector. The end effector comprises a staple cartridge assembly and a staple anvil, staples are placed in the staple cartridge assembly, and the staple anvil and the staple cartridge assembly are closed to clamp the soft tissues, so as to staple the soft tissues together.

The articulation manipulating mechanism comprises a joint assembly, an articulating mechanism and two articulation bands for transmitting actions provided by the articulating mechanism (articulation knob) to the joint assembly, one end of each articulation band is hinged with the articulating mechanism, and the other end of each articulation band is hinged with the joint member to form a linkage mechanism; and the articulating mechanism is adapted for driving one of the two articulation bands to make an advancing movement, and driving the other one to make a retraction movement, so as to drive the joint member to be articulated.

SUMMARY

A surgical instrument provided by the present invention can realize the locking of a joint assembly in a closed state, so as avoid the problem that an end effector shakes freely in the closed state.

The present application provides a surgical instrument, which comprises: an end effector adapted for operating tissue, having an open state for receiving the tissue and a closed state for stapling the tissue; a handle portion adapted for operatively providing an opening driving force for opening the end effector or a closing driving force for closing the end effector; an elongated shaft extending distally from the handle portion, and having a longitudinal axis, wherein the elongated shaft is adapted to transmit the driving force from the handle portion to the end effector; a joint assembly respectively connected with the end effector and the elongated shaft; an articulating mechanism adapted for operatively providing articulation driving force to the joint assembly, so as to articulate the end effector relative to the longitudinal axis of the elongated shaft; and a lockout assembly, comprising: a first lock member adapted for selectively locking the articulating mechanism from being operated to articulate; and a second lock member adapted for selectively locking a position of the joint assembly under an operation of the handle portion.

In some embodiments of the present application, the second lock member is arranged to lock the joint assembly when the handle portion is operated to provide the closing driving force to the end effector; and to release the joint assembly when the handle portion is operated to provide the opening driving force to the end effector.

In some embodiments of the present application, the elongated shaft comprises an outer tube, and the second lock member is engaged with the outer tube, so that the second lock member moves synchronously or substantially synchronously with the outer tube.

In some embodiments of the present application, a support is arranged inside a distal portion of the outer tube, a slider is slidably connected to the support, the slider is connected with the outer tube through an inserting fitting portion, and the second lock member is connected with the slider directly or through a first biasing member.

In some embodiments of the present application, the inserting fitting portion comprises a recess or a protrusion arranged on an inner wall of the outer tube, and a protrusion or a recess correspondingly arranged on the slider.

In some embodiments of the present application, the joint assembly comprises an joint member, a lock groove is arranged on the joint member, and the lock groove is operated to be engaged with the second lock member to lock the position of the joint assembly.

In some embodiments of the present application, the outer tube is operated to move distally along the longitudinal axis under an action of a closing mechanism; and to move to proximately along the longitudinal axis under an action of an opening mechanism.

In some embodiments of the present application, the closing mechanism comprises: a closure trigger arranged to be operatively rotated about a pivot pin, and having a closed position and an unlocked position, wherein a plurality of first transmission teeth are arranged on the closure trigger; a closing transmission member provided with a plurality of second transmission teeth are engaged with the first transmission teeth, which is slidably received within a frame extending along the longitudinal axis; and a coupling member adapted for coupling the closing transmission member with the outer tube; and when the closure trigger is operated, the closing transmission member is actuated to move distally along the frame, so as to actuate the outer tube to move distally.

In some embodiments of the present application, the opening mechanism comprises: an opening button arranged to operatively rotate about a pivot pin, wherein the opening button is provided with an opening lock portion adapted to be engaged with the closure trigger; and a second biasing member arranged between the closing transmission member and the frame, adapted for biasing the closing transmission member at the proximal end thereof; and when the opening button is triggered, the opening lock portion release of the closure trigger from the closed position, and is biased to move proximately by the second biasing member, so that the outer tube is actuated to move proximately.

In some embodiments of the present application, the first lock member comprises a first bar portion and a second lock tooth which are respectively engaged with the articulating mechanism, wherein the first bar portion is operatively engaged with the articulating mechanism to release the articulating mechanism from being locked by the second lock tooth.

In some embodiments of the present application, the articulating mechanism comprises a first cam disk, a second cam disk and an articulation knob for actuating the first cam disk and the second cam disk to rotate, wherein the first cam disk is operatively engaged with the first bar portion of the first lock member, the second cam disk is operatively engaged with the second lock tooth of the first lock member; and the first cam disk is operated by the articulation knob so as to actuate the first bar portion of the first lock member to disengage the second lock tooth of the first lock member from the second cam disk.

In some embodiments of the present application, the first cam disk is provided with a plurality of first lock notches adapted to be engaged with the first bar portion of the first lock member, and the second cam disk is provided with a plurality of second lock notches adapted to be engaged with the second lock tooth of the first lock member.

In some embodiments of the present application, the first cam disk is stacked on the second cam disk and is allowed to be rotated with respect to the second cam disk for a certain angle; wherein the first bar portion and the second lock tooth are arranged on the first lock member so as to be aligned with the first cam disk and the second cam disk respectively.

In some embodiments of the present application, the articulating mechanism further comprises a first member engaged with the articulation knob and the first cam disk respectively, so as to operatively drive the first cam disk to rotate.

In some embodiments of the present application, the articulating mechanism further comprises a transmission gear coaxially and fixedly engaged with the second cam disk, wherein the transmission gear is operatively to be engaged with a articulating transmission assembly to articulate the joint assembly.

In some embodiments of the present application, the articulating transmission assembly comprises a rack engaged with the articulating mechanism and an articulation band, a proximal end of the articulation band is engaged with the rack, and a distal end of the articulation band is hinged to the joint member of the joint assembly.

In some embodiments of the present application, the joint member is provided with an aperture and a transmission hole, wherein the aperture is adapted to receive the pivot, allowing the joint member to be pivotally engaged with the elongated shaft, and the transmission hole is engaged with the articulating transmission assembly so as to be actuated to articulate the joint assembly; wherein an axis of the transmission hole is arranged distally from an axis of the aperture.

In some embodiments of the present application, a distance between the axis of the transmission hole and the axis of the aperture along the longitudinal axis ranges from 0 to 1 mm.

In some embodiments of the present application, a distal end of the elongated shaft is provided with a support, and a distal end of the support is engaged with the aperture of the joint member through the pivot.

In some embodiments of the present application, the articulation band of the articulating transmission assembly is pivotally received within the transmission hole.

The present application provides a surgical instrument, which comprises: a handle portion; an elongated shaft extending distally from the handle portion, wherein the elongated shaft has a longitudinal axis; a joint assembly respectively engaged with a distal end of the elongated shaft and a proximal end of an end effector that is operatively to be actuated by an articulating mechanism to pivot away from the longitudinal axis of the elongated shaft; and a second lock member adapted to be actuated by the handle portion so as to operatively lock a position of the joint assembly, wherein the second lock member is actuated to move synchronously or substantially synchronously with an outer tube of the elongated shaft.

In some embodiments of the present application, wherein the second lock member is arranged to be operatively reciprocated, so that when applies closing driving force is provided from the handle portion to the end effector, the second lock member is actuated to lock the position of the joint assembly; and when opening driving force is provided from the handle portion to the end effector, the second lock member is actuated to release the joint assembly.

In some embodiments of the present application, further comprising: an articulating mechanism adapted to operatively provide articulation driving force to the joint assembly, so as to articulate the end effector relative to the longitudinal axis of the elongated shaft; and a lockout assembly comprising a first lock member, and the first lock member is adapted to operatively lock the articulating mechanism from being articulated.

BRIEF DESCRIPTION OF THE DRAWINGS

Preferred embodiments in the present application will be described in detail hereinafter with reference to the drawings, which will help to understand the present application, wherein.

DETAILED DESCRIPTION

Figure 1:
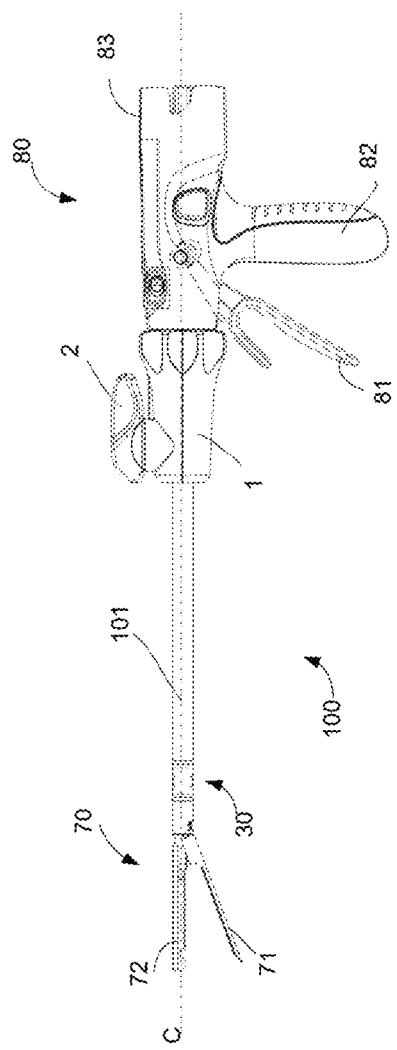
FIG. 1 is a schematic structural diagram of one embodiment of a surgical instrument according to the present application.

The present application is clearly and completely described hereinafter with reference to the drawings. Apparently, the described embodiments are only some but not all of the embodiments of the present application. Based on the embodiments of the present application, all other embodiments obtained by those of ordinary skills in the art without going through any creative work should fall within the scope of protection of the present application.

In the description of the present application, it should be noted that the orientation or position relationship indicated by the terms "center", "up", "down", "left", "right", "vertical", "horizontal", "inside", "outside", and the like is based on the orientation or position relationship shown in the drawings, it is only for the convenience of description of the present application and simplification of the description, and it is not to indicate or imply that the indicated device or element must have a specific orientation, and be constructed and operated in a specific orientation. In addition, the terms "first", "second" and "third" are only used for descriptive purposes and cannot be understood as indicating or implying relative importance.

In the description of the present application, it should be noted that the terms "installation", "connected" and "connection" if any should be understood in a broad sense unless otherwise specified. For example, they may be fixed connection, removable connection or integrated connection; and may be direct connection, or indirect connection through an intermediate medium, and connection inside two elements. The specific meanings of the above terms in the present application may be understood in a specific case by those of ordinary skills in the art.

In addition, the technical features involved in different embodiments of the present application described hereinafter may be combined with each other as long as they do not conflict with each other.

In the embodiments of the present application, the "distal end/side" refers to one end of a surgical instrument far away from an operator during operation, and the "proximal end" refers to one end/side of the surgical instrument close to the operator during operation.

FIG. 1 is a schematic structural diagram of a specific embodiment of a surgical instrument 100. The illustrated embodiment is an endoscopic instrument, and generally speaking, the embodiment of the surgical instrument 100 described herein is an endoscopic surgical instrument for cutting and stapling. However, it should be pointed out that the surgical instrument may also be a non-endoscopic surgical instrument for cutting and stapling, such as an open surgical instrument for open surgery.

Alternatively, the surgical instrument 100 shown in FIG. 1 comprises a handle portion 80, an elongated shaft 101 and an end effector 70, wherein the elongated shaft 101 defining a longitudinal axis C extends distally from a distal portion of the handle portion 80. The end effector 70 comprises an anvil assembly 71 and a staple cartridge assembly that is detachably received within a cartridge channel 72, and the end effector 70 is adapted to execute specific surgical operations, as well as to manipulate tissues, such as clamping, suturing/stapling and cutting the tissue. A movable firing member for executing the specific surgical operations is arranged in the end effector 70. It should be understood that, although the end effector 70 for cutting and stapling the tissue is provided in the embodiment of the surgical instrument 100 described herein, end effectors of other technologies for cutting and stapling the tissue may also be used in an alternative embodiment. For example, an end effector for stapling the tissue by using radio frequency (RF) energy or an adhesive may also be used. In one embodiment, the handle portion 80 is arranged to operatively provide opening driving force for opening the end effector 70 or closing driving force for closing the end effector 70; and the elongated shaft 101 extends distally from the handle portion 80, defining the longitudinal axis, and the elongated shaft 101 is arranged to transmit driving force of the handle portion 80 to the end effector 70.

Figure 2:
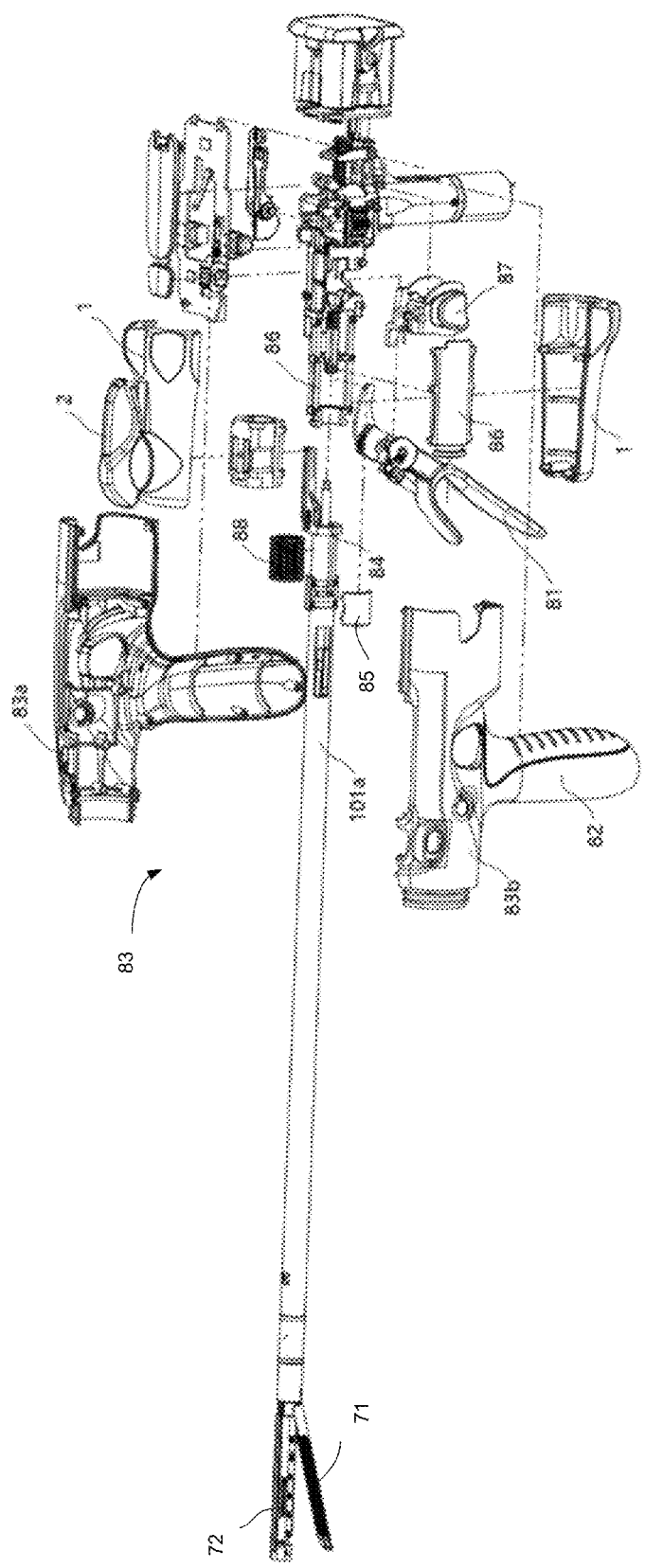
FIG. 2 is an exploded view of a part of a handle portion of the surgical instrument according to the present application.
Figure 4A:
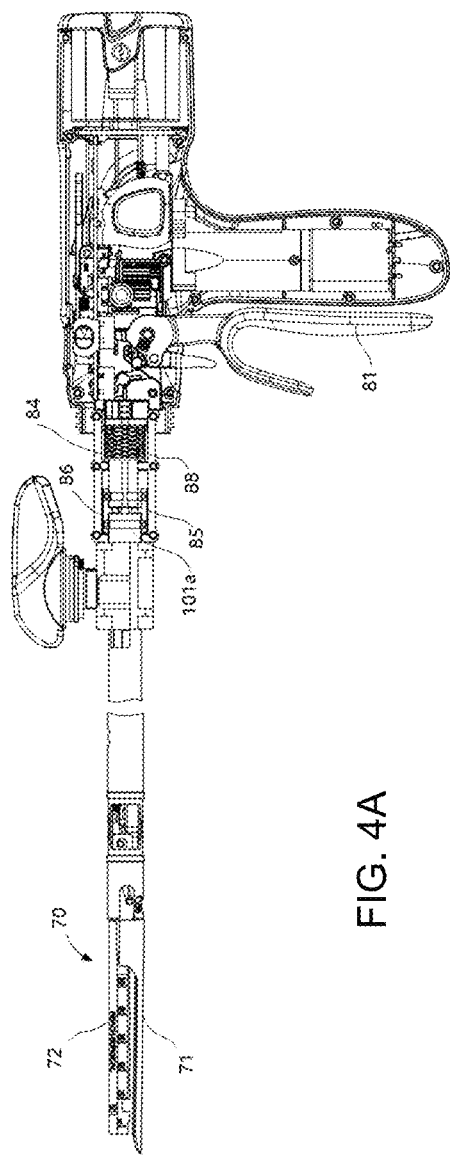
FIG. 4A is another schematic structural diagram of the closure trigger moved to the closed position in the surgical instrument according to the present application.
Figure 4B:
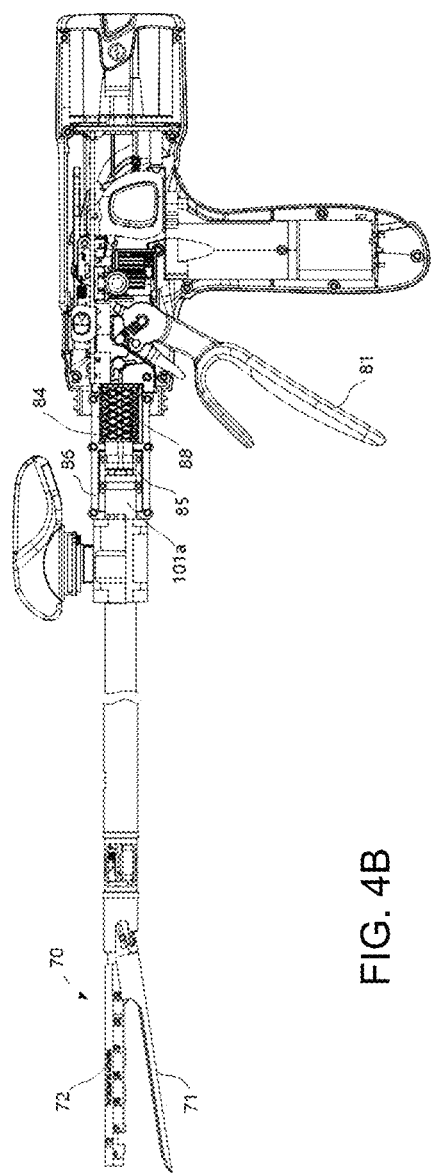
FIG. 4B is another schematic structural diagram of the closure trigger unlocked by the opening button in the surgical instrument according to the present application.

As shown in FIG. 2 and FIG. 4A to FIG. 4B, the handle portion 80 comprises a handle housing 83, and a closing mechanism and an opening mechanism which are mounted in the handle housing 83, wherein the closing mechanism is arranged to control the anvil assembly 71 of the end effector 70 to pivot towards the cartridge channel 72 till the end effector 70 is closed. The opening mechanism is arranged to control the anvil assembly 71 of the end effector 70 to pivot away from the cartridge channel 72 till a set position is reached, where the end effector 70 is opened.

As shown in FIG. 1 and FIG. 2, the handle housing 83 comprises a first half 83a and a second half 83b, and the first half 83a and the second half 83b may be detachably connected by a buckle, a fastener, and the like, and form a T-shape as a whole. A part of the handle housing 83 extending along the longitudinal axis C forms an accommodating part for the closing mechanism and the opening mechanism, and a part of the handle housing 83 extending perpendicular to the longitudinal axis C or a part of the handle housing 83 inclined at a certain angle relative to the longitudinal axis C forms a grip portion 82.

Figure 3A:
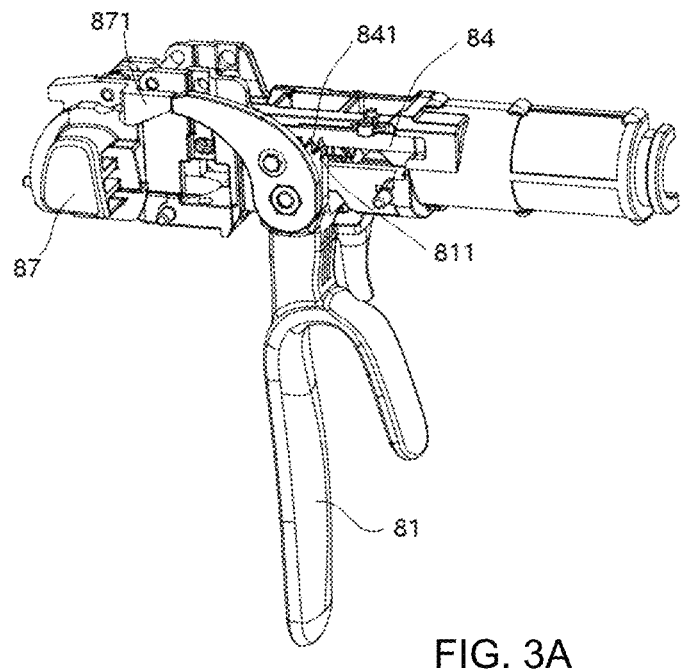
FIG. 3A is a schematic structural diagram of a closure trigger moved to a closed position in the surgical instrument according to the present application.
Figure 3B:
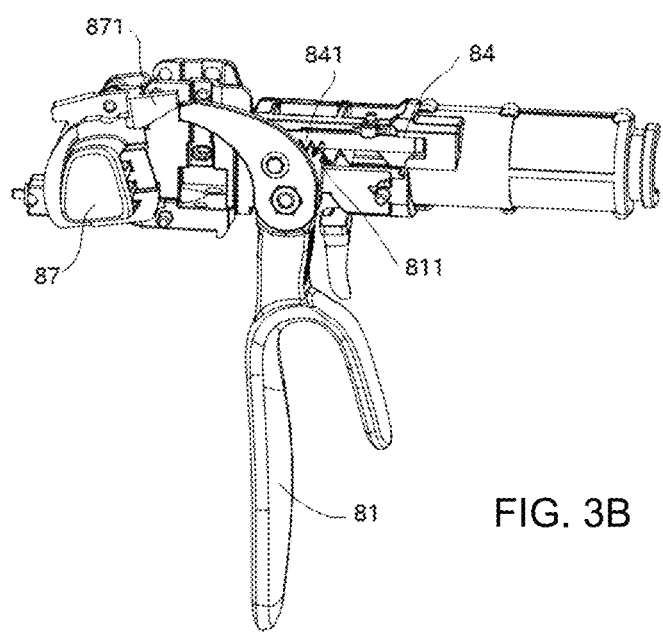
FIG. 3B is a schematic structural diagram of the closure trigger unlocked by an opening button in the surgical instrument according to the present application.

With reference to FIG. 2, the closing mechanism comprises a closure trigger 81, a closing transmission member 84 and a coupling member 85 which is adapted for coupling the closing transmission member 84 with an outer tube 101a of the elongated shaft 101. The closure trigger 81 is operatively pivoted about a pivot pin, and has a closed position and an unlocked position. The closure trigger 81 is provided with a plurality of first transmission teeth 811 adapted for being engaged with the second transmission teeth 841 arranged on the closing transmission member 84 (as shown in FIG. 3A to FIG. 3B) that is slidably received within a frame 86 extending along the longitudinal axis C. During operation, when the closure trigger 81 is moved towards the grip portion 82, as shown in FIG. 4A, the closing transmission member 84 is actuated by the closure trigger 81 so as to be moved distally along the frame 86, further drives the outer tube 101a to be moved distally, thus actuating the anvil assembly 71 to pivot towards the cartridge channel 72 till the jaw of the end effector 70 is closed.

As shown in FIG. 2 and FIG. 3A to FIG. 3B, the opening mechanism comprises an opening button 87 operatively to be rotated about a pivot pin, and a second biasing member 88 located between the closing transmission member 84 and the frame 86, and the second biasing member 88 provides a biasing force at a proximal end of the closing transmission member 84. The opening button 87 is provided with an opening lock portion 871 which is operatively engaged with the closure trigger 81, and when the closure trigger 81 is moved towards the grip portion 82 to reach a set position, as shown in FIG. 3A, the opening lock portion 871 locks the closure trigger 81. When the opening button 87 is triggered, as shown in FIG. 3B and FIG. 4B, the opening lock portion 871 releases the closure trigger 81 from the closed position thereof, and the closing transmission member 84 is actuated to move proximately under an action of the second biasing member 88, and actuates the outer tube 101a to move proximately. Therefore, the anvil assembly 71 is pivotally moved away from the cartridge channel 72 under an action of the biasing member till the end effector 70 is opened.

As shown in FIG. 1 to FIG. 5, the elongated shaft 101 is arranged to transmit various driving forces (such as a driving force for opening or closing the end effector 70, a driving force for driving the firing member to move, and the like) provided by the handle portion 80 to the end effector 70. The elongated shaft 101 comprises the outer tube 101a, a proximal end of which is engaged with the closing transmission member 84 of the handle portion 80, and a distal end thereof is rotatably engaged with a proximal end of an outer tube portion 73 at a proximal end of the end effector 70 through a pivot member 31.

The surgical instrument 100 provided in the embodiment of the present application further comprises a rotatable knob 1 arranged on a distal side of the handle portion 80 and fixedly engaged with a proximal end of the elongated shaft 101, and when the rotatable knob 1 is operated to rotate with respect to the longitudinal axis (referring to the longitudinal axis C in FIG. 1) of the surgical instrument 100, the elongated shaft 101 and the end effector 70 can be driven to rotate together.

Figure 5:
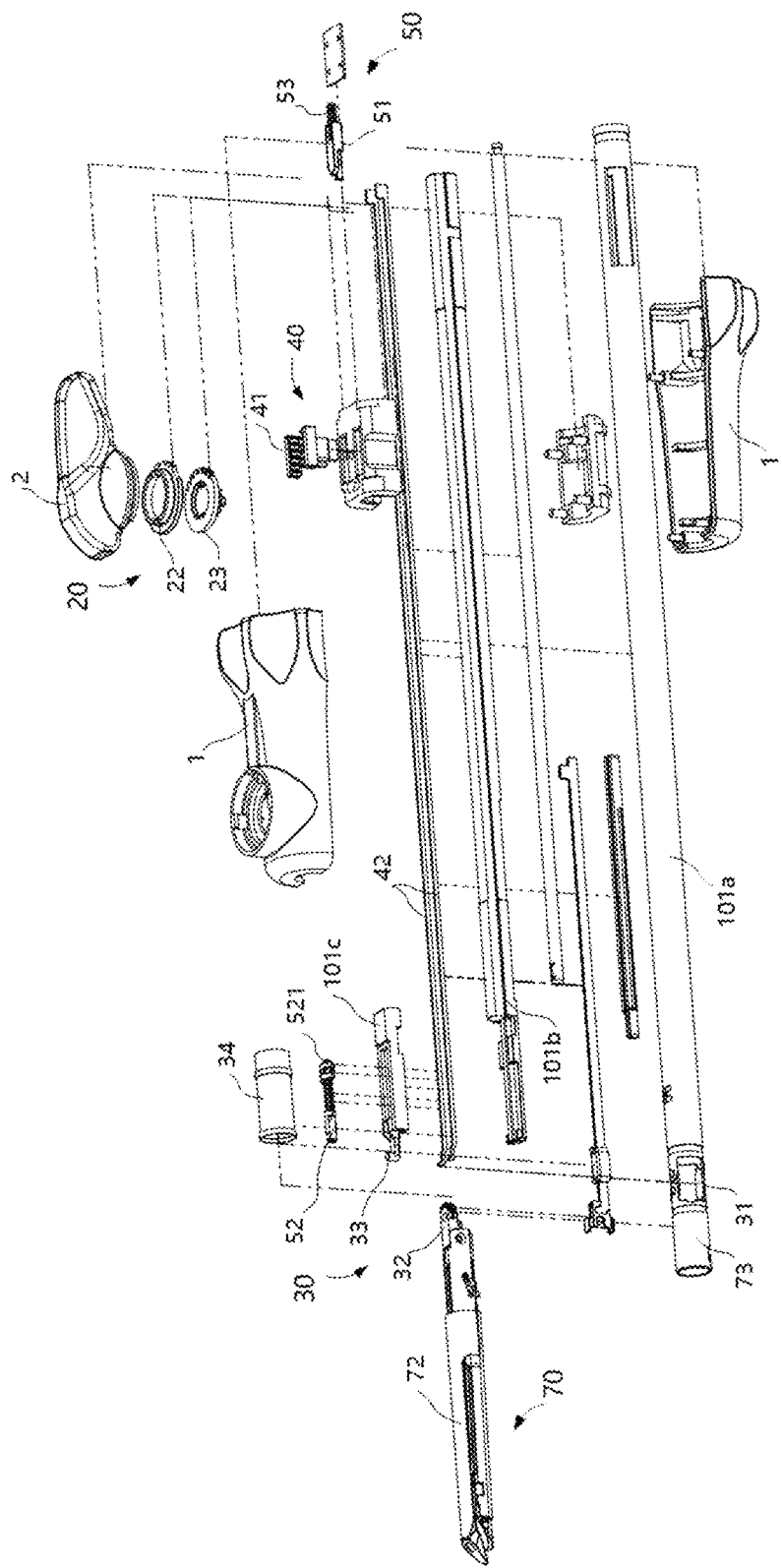
FIG. 5 is an exploded view of a partial structure of the surgical instrument according to the present application.
Figure 12:
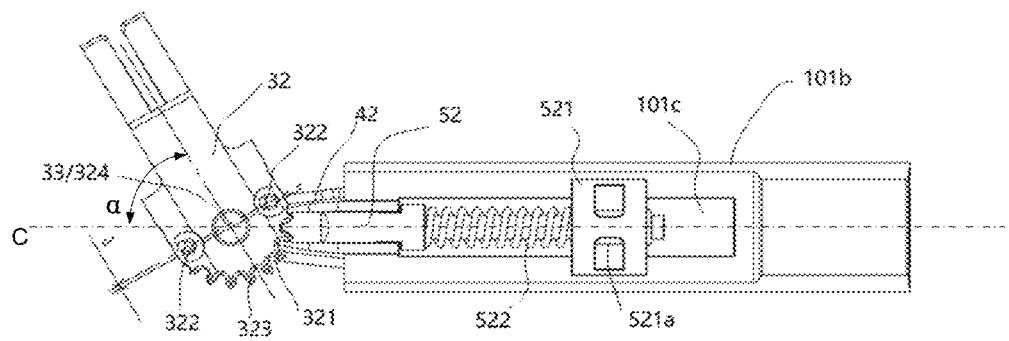
FIG. 12 is a schematic structural diagram of the matching between a distal end of an elongated shaft and a joint member.

In order to articulate the end effector 70 to a target angle with respect to the longitudinal axis C of the elongated shaft 101, as shown in FIG. 5, the elongated shaft 101 and the end effector 70 are engaged through a joint assembly 30 which comprises a joint member 32, a distal end of which is fixedly engaged with the end effector 70, and a proximal end thereof is pivotally engaged with the elongated shaft 101 through a pivot 33. Alternatively, a distal end of the frame 101b of the elongated shaft 101 is provided with a support 101c, and a distal end of the support 101c is pivotally engaged with the joint member 32 through the pivot 33. An aperture 324 (as shown in FIG. 12) is arranged in the joint member 32, and the aperture 324 is adapted to receive the pivot 33, so that the joint member 32 is pivotally engaged to the frame 101b of the elongated shaft 101. Furthermore, the joint assembly 30 is wrapped with a protective cover 34.

The surgical instrument 100 provided in the embodiment of the present application further comprises an articulating mechanism 20 for articulating the joint assembly 30, and an articulating transmission assembly 40. The articulating mechanism 20 is adapted for providing articulation driving force to the joint assembly 30, so as to articulate the end effector 70 with respect to the longitudinal axis of the elongated shaft 101. As shown in FIG. 5, the articulating mechanism 20 comprises an articulation knob 2 rotatably mounted on the rotatable knob 1, and when the articulation knob 2 is operated to rotate, the end effector 70 is articulated accordingly. The articulating transmission assembly 40 transmits the articulating driving force provided by the articulating mechanism 20 to the joint assembly 30, so as to articulate the end effector 70 away from the longitudinal axis of the elongated shaft 101, executing articulation operation of the end effector 70.

Figure 6:
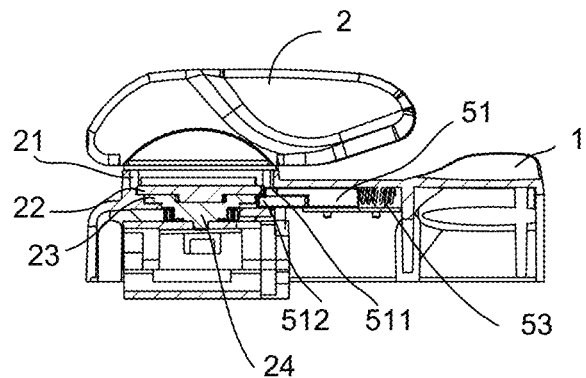
FIG. 6 is a schematic diagram of a longitudinal section at a rotatable knob of the surgical instrument according to the present application.
Figure 7:
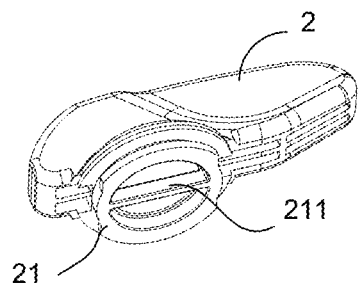
FIG. 7 is a schematic structural diagram of a articulation knob of the surgical instrument according to the present application.
Figure 8A:
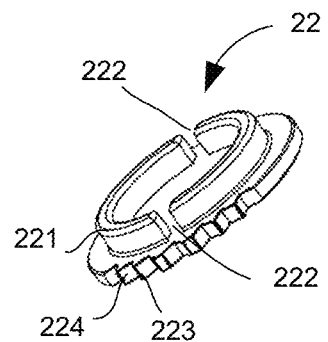
FIG. 8A and FIG. 8B are schematic structural diagrams of a first cam disk of an articulating mechanism.

With reference to FIG. 6, the articulating mechanism 20 in the embodiment of the present application comprises a first cam disk 22 that is axially fixed on a bottom portion of the articulation knob 2. In the embodiment, the first cam disk 22 is axially fixed to the bottom portion of the articulation knob 2 through a first member 21. For example, as shown in FIG. 7, a bar 211 is arranged on an inner wall of the first member 21. Accordingly, as shown in FIG. 8A, a ridge 221 is arranged on a top surface of the first cam disk 22 extending upwards therefrom, configured to be engaged with the first member 21 through a pair of holes 222 symmetrically arranged in the ridge 221. The bar 211 of the first member 21 is received within the holes 222 of the first cam disk 22 so as to be clamped therewith, realizing the circumferential fixed connection between the articulation knob 2 and the first cam disk 22. When the articulation knob 2 is operated to rotate, the first member 21 and the first cam disk 22 rotate accordingly. In an alternative embodiment, the articulation knob 2 and the first cam disk 22 may also be engaged and fixed in other ways, such as being locked and engaged by a fastener, and the fastener may be a screw or a bolt; or a bottom portion of the articulation knob 2 is welded and fixed on the top surface of the first cam disk 22.

Figure 8B:
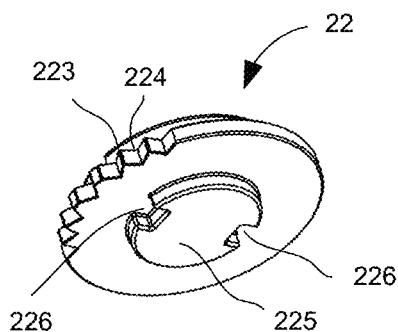

In one embodiment, with reference to FIG. 8A and FIG. 8B, at least two first notches 224 are arranged in a circumferential outer wall of the first cam disk 22, defining a first protrusion 223 by each two adjacent first notches 224. Alternatively, seven, or two, three, four, five, six, eight or more first notches 224 may be provided on the first cam disk 22. For example, the amount of the first notches 224 could be set as an odd number, and the first notch 224 located in the middle is defined as the initial position (non-articulated position) notch.

Figure 9A:
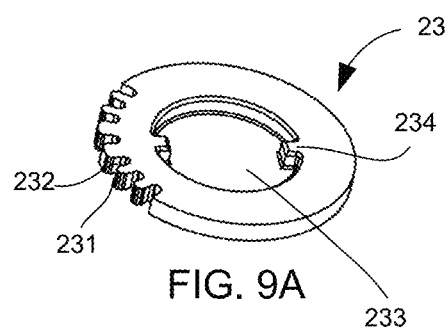
FIG. 9A and FIG. 9B are schematic structural diagrams of a second cam disk and a transmission gear of the articulating mechanism.

With reference to FIG. 6, the articulating mechanism 20 further comprises a second cam disk 23 coaxially stacked on the first cam disk 22. For example, the first cam disk 22 may be stacked on the first cam disk 22 by being rotated a certain angle relative to the second cam disk 23. For example, as shown in FIG. 8B, a protruding portion 225 is extending axial-downwardly from a bottom surface of the first cam disk 22, and a pair of recesses 226 are symmetrically arranged on an outer peripheral wall of the protruding portion 225. Accordingly, as shown in FIG. 9A, the second cam disk 23 comprises an inner opening 233 having a protrusion 234 extending radial inwardly thereon. In one embodiment, a pair of the protrusions 234 may be provided, for example, symmetrically arranged in the inner opening 233 so as to be engaged with the respective recesses 226 on the protruding portion 225 of the first cam disk 22. The protruding portion 225 of the first cam disk 22 is embedded in the inner opening 233 of the second cam disk 23, and the protrusion 234 is engaged with the recess 226 on the protruding portion 225 of the first cam disk 22, so that when the first cam disk 22 is operated to rotate, the second cam disk 23 may be actuated to rotate together.

In one embodiment, with reference to FIG. 9A, similar to the first cam disk 22, at least two second notches 232 are arranged in a circumferential outer wall of the second cam disk 23, defining a second tooth 231 by each two adjacent second notches 232. The amount of the second notches 232 of the second cam disk 23 shall be set corresponding to the amount of the first notches 224 of the first cam disk 22. For example, the amount of the second notches 232 of the second cam disk 23 could be set as seven, or alternatively, be set as two, three, four, five, six, eight or more. For example, the amount of the second notches 232 could be set as an odd number, and the second notch 232 located in the middle is defined as the initial position (non-articulated position) notch.

Figure 9B:
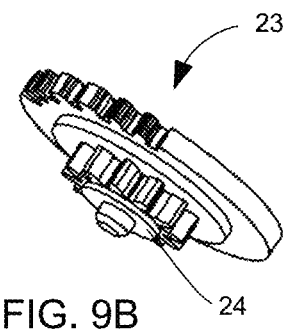

In one embodiment, with reference to FIG. 9B, a transmission gear 24 is coaxially and fixedly mounted on the second cam disk 23, so that the rotation of the second cam disk 23 synchronously or substantially synchronously drives the transmission gear 24 to rotate.

Figure 10:
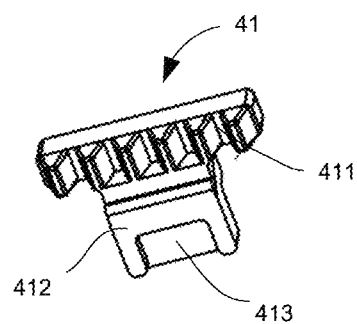
FIG. 10 is a schematic structural diagram of a rack in a bending transmission mechanism according to the present application.
Figure 11:
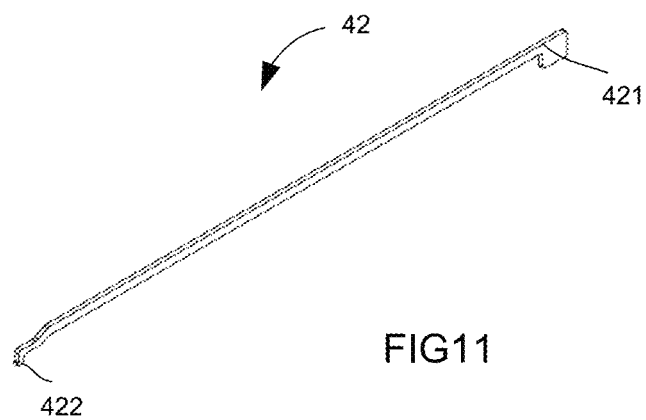
FIG. 11 is a schematic structural diagram of an articulation band in the bending transmission mechanism according to the present application.

With reference to FIG. 5, the articulating transmission assembly 40 is adapted for transmitting the articulation driving force provided by the articulating mechanism 20 to the joint assembly 30. For example, the articulating transmission assembly 40 comprises a rack 41 and an articulation band 42. With reference to FIG. 5, FIG. 9B and FIG. 10, one part of the rack 41 provided with teeth 411 is engaged with the transmission gear 24 of the articulating mechanism 20, and the other part of the rack 41 is fixedly connected with a proximal end of the articulation band 42. A distal end of the articulation band 42 is engaged with the joint assembly 30 to transmit the articulation driving force to the joint assembly 30. For example, as shown in FIG. 12, transmission holes 322 are respectively arranged on two sides of the aperture 324 in the joint member 32, and the transmission hole 322 is adapted for being hinged with the distal end of the articulation band 42. Alternatively, as shown in FIG. 11, a second hook portion 422 is arranged at the distal end of the articulation band 42, and the second hook portion 422 is hinged to the transmission hole 322. When the transmission gear 24 of the articulating mechanism 20 is operated to rotate, two racks 41 of the articulating transmission assembly 40 are driven to reciprocate longitudinally (along the longitudinal axis C), and the articulation bands 42 is further driven to reciprocate, wherein one articulation band 42 moves distally, and the other articulation band 42 moves proximately, so that the joint member 32 pivotally rotates around the pivot 33, so as to finally realize an articulation operation on the end effector 70. In an alternative embodiment, the articulation band 42 and the joint member 32 may also be hinged in other ways. Moreover, as an alternative embodiment, the articulation band 42 may also be set as a tubular or rod-shaped structure.

FIG. 10 shows a structure of the rack 41. In this embodiment, a mounting base 412 is arranged on the bottom portion of the rack 41, which is further provided with a groove 413 arranged thereon. Accordingly, as shown in FIG. 11, a first hook portion 421 is arranged at the proximal end of the articulation band 42, which is received in the groove 413 of the rack 41, so as to be fixed engaged between the articulation band and the rack. Alternatively, the first hook portion 421 of the articulation band 42 may be directly welded to the groove 413 of the rack 41, so as to achieve fixed connection. Alternatively, as an alternative embodiment, the rack 41 and the articulation band 42 may also be fixedly connected by a fastener, such as a screw or a bolt, or may be fixedly connected by welding.

Alternatively, as shown in FIG. 10, the mounting base 412 of the rack 41 is designed as an inverted L-shape, an end portion of an L-shaped horizontal portion is fixed on the bottom portion of the rack 41, and the groove 413 is arranged in an inner wall surface of an L-shaped vertical portion, so that the articulation band 42 is mounted behind the groove 413 and located on an inner side the rack 41, so as to make a structure of the articulating transmission assembly 40 more compact.

In some surgeries, operating space for surgeons are quite limited (such as a low rectal resection/anastomosis, or a thoracoscopic lung and bronchus resection/anastomosis), the instrument is often expected to be able to provide a larger articulation angle, and an articulation radius of the instrument should be as small as possible. The joint member 32 is actuated by the articulation band 42 to articulate the end effector 70 of the instrument to a target angle, and a partial area where the support 101c is engaged with the joint member 32 often limits an interference with a movement track of the articulation band 42.

Therefore, in an alternative embodiment, with reference to FIG. 12, the axis of the transmission hole 322 is arranged distally from the axis of the aperture 324. For example, a distance between the axis of the transmission hole 322 and the axis of the aperture 324 along the longitudinal axis is represented as "a", which ranges from 0 to 1 mm. Or, "a" could be ranged from 0 to 0.2 mm. In the embodiment, when the end effector 70 is articulated to its limited articulated position, where could be referred as max-angled position, the articulation band 42 on one side abuts against a partial edge of a distal side of the support 101c, while a gap formed by the articulation band 42 on the other side and the partial edge of the distal side of the support 101c is reduced or removed, and vice versa. In this way, the distribution of the gap between the articulation band 42 and the part of the distal side of the support 101c is optimized when the instrument is articulated to the limited position, so that the end effector 70 can reach a larger articulated angle. The angle α formed by the end effector 70 relative to the longitudinal axis C of the elongated shaft is defined as the articulated angle, and the articulated angle α can reach 0° to 70° in this embodiment. Alternatively, the articulated angle α could be ranged from 0° to 65°. On the basis of the above embodiment, the surgical instrument 100 according to the embodiment of the present application further comprises a lockout assembly 50 having a first lock member 51 for operatively locking the articulating mechanism 20 from being articulated. For example, when the surgical instrument 100 is operated to articulate, the articulating mechanism 20 is firstly released from being locked by the first locking member 51, and after the end effector 70 is articulated to a specified position, the articulating mechanism 20 is further locked by the first lock member 51. The end effector 70 is articulated to the specified position, where the end effector 70 is articulated by a certain angle relative to the longitudinal axis.

Figure 13:
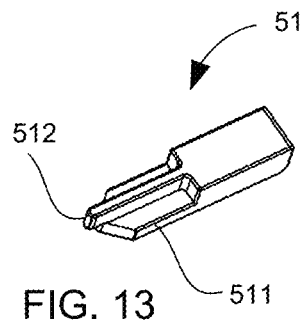
FIG. 13 is a schematic structural diagram of a first lock member according to the present application.

As shown in FIG. 5 and FIG. 6, the first lock member 51 is arranged in the rotatable knob 1 through a third biasing member 53 that may be specifically set as a compression spring, or an elastic sheet. With reference to FIG. 13, the first lock member 51 comprises a first bar portion 511 and a second lock tooth 512 stacked thereon, wherein the first bar portion 511 is configured to be engaged with the first lock notch 224 of the first cam disk 22, and the second lock tooth 512 is configured to be engaged with the second lock notch 232 of the second cam disk 23, and a distal end of the second lock tooth 512 extends out of a distal end of the first bar portion 511.

Figure 14A:
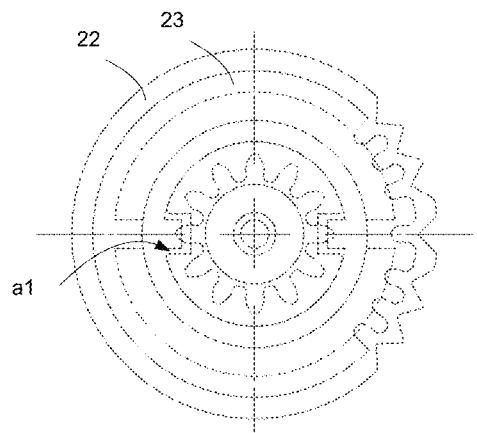
FIG. 14A to FIG. 14C are schematic structural diagrams of the articulating mechanism.
Figure 14B:
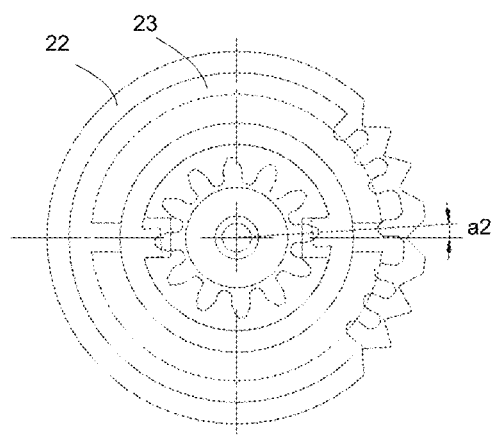

In one embodiment, the first cam disk 22 is allowed to be rotated a certain stroke with respect to the second cam disk 23 for being unlocked, hereafter will be referred as "unlocking stroke", which is the angle "a2" of the first cam disk 22 allowed to rotated relative to the second cam disk 23 (with reference to FIG. 14B, an internal structure is shown by a dotted line). For example, there is a gap "a1" between the side wall of each of the protrusions 234 of the second cam disk 23 and the side wall of each of the recesses 226 of the first cam disk 22 (with reference to FIG. 14A, an internal structure is shown by a dotted line), allowing the first cam disk 22 to be rotated to reach the angle "a2".

Figure 14C:
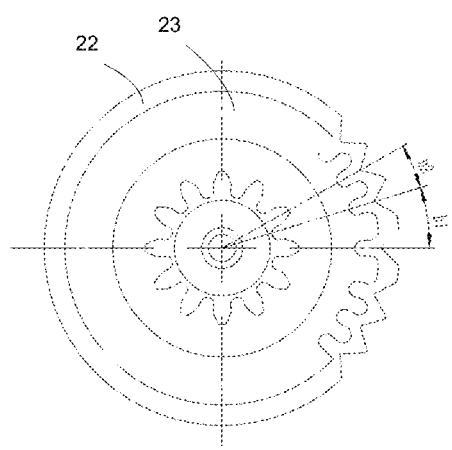

In one embodiment, as shown in FIG. 14C, in the articulating mechanism 20, when the first cam disk 22 and the second cam disk 23 are in the initial position, the angle "b1" formed by the first lock notch 224/the second lock notch 232 of the first cam disk 22/the second cam disk 23 in the initial state and the adjacent first lock notch 224/the second lock notch 232 is larger than the angle "b2" formed by other adjacent the first lock notch 224/the second lock notch 232.

Since the transmission gear 24 is engaged with the rack 41, the articulation band 42 is pivotally coupled with the joint assembly 30, the bar 211 of the articulation knob 2 is coupled with the first cam disk 22, and the articulation band 42 is engaged with the rack 41, there is an inevitable assembly clearance in the transmission matching between adjacent components. In unlocked state, when being shifted from the initial position to a first articulated position, the first cam disk 22 is operated to be rotated for the angle "b1", which is larger than the angle "b2" for which the first cam disk is rotated from the first articulated gear to a second articulated position, as well as the angle "b2" for which the first cam disk is rotated to shift to the next position, which compensates the assembly clearance of the engagement of the aforementioned components, so that the above components are maintained in a taut state, allowing a first articulated position of the articulating mechanism 20 and a first articulated position of the joint assembly 30 are ensured to synchronously or substantially synchronously reach a predetermined angle.

In the articulation mechanism of the surgical instrument 100 in the embodiment of the present application, the second cam disk 23 of the articulating mechanism 20 is shifted between the locked state and the unlocked state through the reciprocating movement of the first lock member 51 of the lockout assembly 50.

Subsequently, with reference to FIG. 15A to FIG. 15E, multiple states of the articulation operation of the articulation mechanism will be described in details.

Figure 15A:
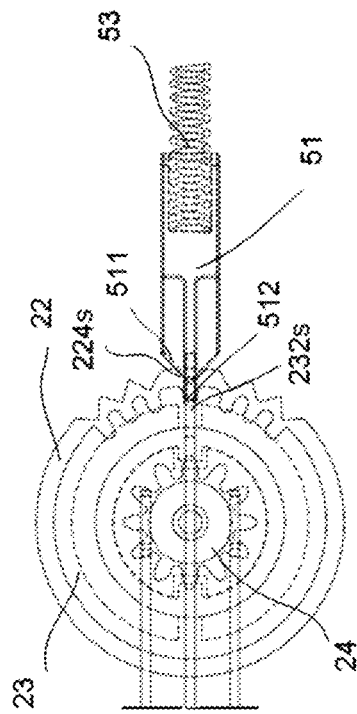
FIG. 15A to FIG. 15E are schematic structural diagrams of a bending operation system in various states during a bending operation.

Firstly, FIG. 15A shows the surgical instrument 100 of the embodiment of the present application in the locked state when it is in the initial position (non-articulated position). The first lock member 51 is biased by the third biasing member 53 so as to be engaged with the first cam disk 22 and the second cam disk 23 of the articulating mechanism 20. Specifically, the first bar portion 511 of the first lock member 51 is engaged with the first lock notch 224 of the first cam disk 22 corresponding to the initial position (non-articulated position), and the second lock tooth 512 of the first lock member 51 is engaged with the second lock notch 232 of the second cam disk 23 corresponding to the initial position (non-articulated position). The surgical instrument 100 is in an initial locked state.

Figure 15B:
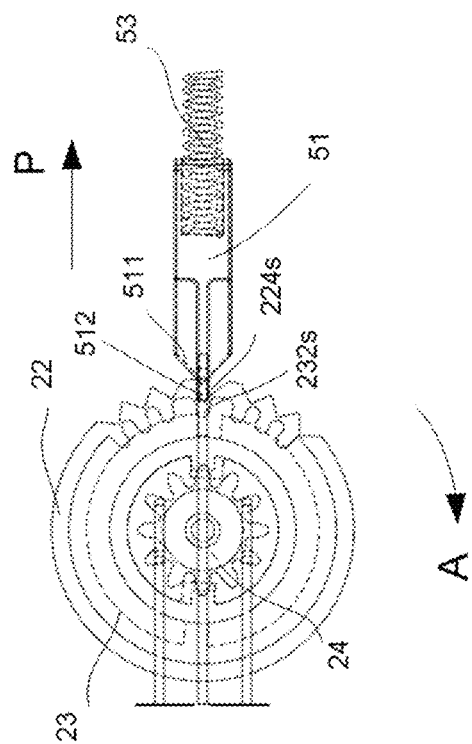

Further with reference to FIG. 15B, the articulation knob 2 is operated to rotate in a direction represent by arrow A, actuating the first cam disk 22 to rotate accordingly. The first cam disk 22 overcomes a biasing force of the third biasing member 53 provided on the first lock member 51, and the first bar portion 511 of the first lock member 51 is urged to move proximally by the side wall of the first lock notch 224 of the first cam disk 22 (in a direction represent by arrow P). The second lock tooth 512 of the first lock member 51 has not completely been disengaged from the second lock notch 232 of the second cam disk 23, and the second cam disk 23 is still being locked by the second lock tooth 512. Because the second lock member 52 and the first lock member 51 are arranged to move synchronously or substantially synchronously, when the first lock member 51 is operated to move proximately, the second lock member 52 also moves proximately accordingly, and as the first cam disk 22 is operated to rotate in the direction of the arrow A, the offset angle between the first cam disk 22 and the second cam disk 23 is gradually increased to reach "a2".

Figure 15C:
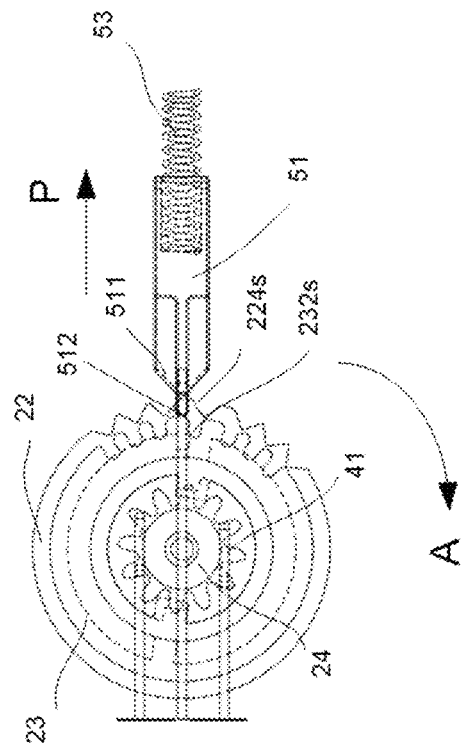

With reference to FIG. 15C, the articulation knob 2 is further operated to rotate in the direction of the arrow A, and the first lock member 51 is actuated to move proximately (the arrow P) by the first cam disk 22, so that the second lock tooth 512 of the first lock member 51 is removed from the second lock notch 232 of the second cam disk 23. Wherein the articulation mechanism is shifted to the unlocked state, the first cam disk 22 has been rotated relative to the second cam disk 23 for angle "a2", the second cam disk 23 is released, the second cam disk 23 is allowed to be further rotated together with the first cam disk 22, and the transmission gear 24 mounted on the second cam disk 23 also being rotated accordingly, so that the joint member 32 is driven to articulate about the pivot 33 through the rack 41 and the articulation band 42 of the articulating transmission assembly 40. For example, the articulation knob 2 drives the first cam disk 22 to rotate, and the first cam disk 22 and the second cam disk 23 move integrally, thus driving the joint member 32 to articulate about the pivot 33.

Figure 15D:
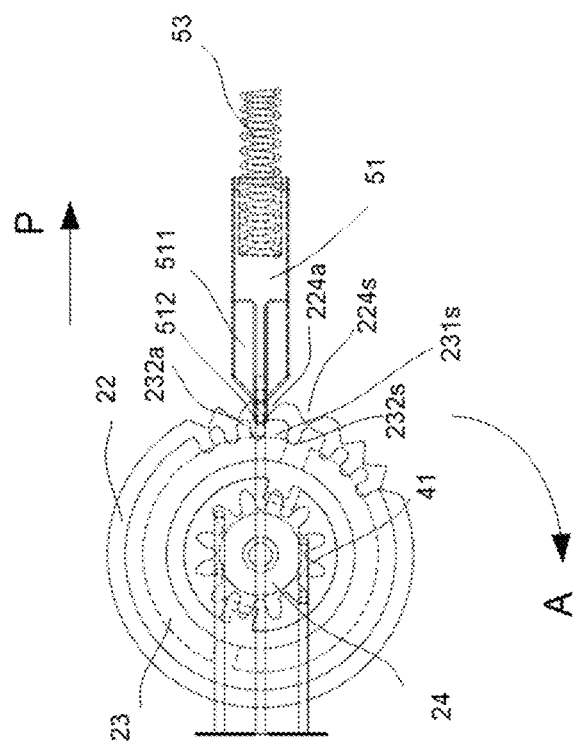
Figure 15E:
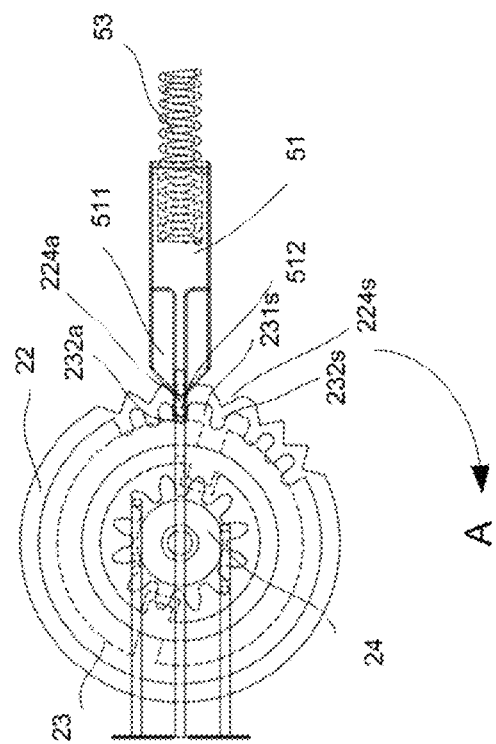

With reference to FIG. 15D, the articulation knob 2 is further operated to rotate in direction of the arrow A, so that the first cam disk 22 and the second cam disk 23 are further actuated to rotate in direction of the arrow A. Then, the second lock tooth 512 of the first lock member 51 moves over an end surface of the second tooth 231 of the second cam disk 23, wherein the second tooth 231 corresponds to the initial position (non-articulated position). The first lock member 51 is biased by the third biasing member 53 so as to be moved distally (in direction of arrow D), and is gradually received within the second lock notch 232a of the second cam disk 23 corresponding to the first-articulated position. The first lock member 51 is biased by the third biasing member 53 so as to be moved distally (in direction of arrow D), so that the first bar portion 511 of the first lock member 51 is received within the first lock notch 224a of the first cam disk 22 corresponding to the first-articulated position, as shown in FIG. 15E, accordingly, the second lock tooth 512 of the first lock member 51 is received within the second lock notch 232a of the second cam disk 23 corresponding to the first-articulated position. As a result, the articulation mechanism is operated to shift to the first-articulated position, as well as to lock the movement of the joint assembly 30.

Further operating the articulation knob 2 to rotate in direction of arrow A, the abovementioned process will be repeated, so that the articulation mechanism will be operated to the further articulated position(s). Furthermore, operating the articulation knob 2 to rotate in opposite direction of arrow A, and based on the same principle, the articulation mechanism will be operated to articulate to the other side, which will not be repeated herein.

As shown in FIG. 12, the lockout assembly 50 further comprises the second lock member 52 for operatively locking the position of the joint assembly 30. By operating the handle portion 80, the second lock member 52 is actuated for locking the position of the joint assembly 30 which improves the stability of the end effector. For example, the second lock member 52 is actuated to lock the position of the joint assembly 30 when the closing driving force to the end effector 70 is provided by the handle portion 80; the second lock member 52 is actuated to release the joint assembly 30 when the opening driving force to the end effector 70 is provided by the handle portion 80. The position of the joint assembly 30 is locked when the end effector 70 is in the closed state, which improves the stability of the end effector 70. Even if the surgical instrument is subjected to external forces such as a bump and a collision, the end effector 70 will not shake, and the joint member 32 of the joint assembly 30 will not rotate relative to the elongated shaft either.

With reference to FIG. 12, the lock groove 321 is arranged in a circumferential outer wall of a proximal side of the joint member 32, and the lock groove 321 is configured to be engaged with the second lock member 52 so as to lock or unlock the position of the joint assembly 30. The amount of the lock grooves 321 may be set according to the articulated positions of the articulation mechanism, and when the amount of the lock grooves 321 is set to be an odd number, the lock groove 321 located in the middle (align with the longitudinal axis) is corresponding to the initial position.

The support 101c is arranged inside the distal portion of the outer tube 101a, which is provided with a slider 521 slidably connected thereto. In addition, the slider 521 is connected with the outer tube 101a through an inserting fitting portion, and the second lock member 52 is connected with the slider 521 through a first biasing member 522. When the outer tube 101a is driven by the closing driving mechanism to move distally, the slider 521 is driven to move distally, and the second lock member 52 moves distally along with the slider 521 at the same time until an end portion of a distal end of the second lock member 52 is inserted into the lock groove 321 of the joint member 32, so as to lock the joint member 32. When the outer tube 101a is driven by the opening driving mechanism to move to the proximal end, the slider 521 is driven to move to the proximal end, the second lock member 52 moves to the proximal end along with the slider 521 under an action of the first biasing member 522 at the same time until the end portion of the distal end of the second lock member 52 is separated from the lock groove 321 of the joint member 32, the joint member 32 is unlocked, and the joint member 32 may drive the end effector 70 to bend relative to the longitudinal axis. In some optional embodiments, the second lock member 52 and the slider 521 may also be directly connected.

In one embodiment, the inserting fitting portion comprises a recess or a protrusion arranged on an inner wall of the outer tube 101a, and a protrusion or a recess correspondingly arranged on the slider 521.

Figure 16:
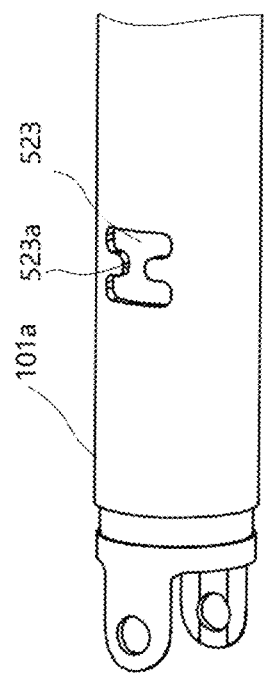
FIG. 16 is a schematic diagram of a partial structure of a distal end of an outer tube of the elongated shaft according to the present application.

Alternatively, with reference to FIG. 16, an opening 523 is arranged in a sleeve wall of the outer tube 101a, the protrusion 523a is formed at the opening 523, and the recess 521a is configured to be engaged with the protrusion 523a at the opening 523 is correspondingly arranged on the slider 521, so as to realize the inserting fitting between the outer tube 101a and the slider 521, which means that the inserting fitting portion comprises the protrusion 523a and the recess 521a.

As an alternative embodiment, the second lock notch 232 of the second cam disk 23 of the articulating mechanism 20 and the lock groove 321 of the joint member 32 of the joint assembly 30 are both provided with inclined surfaces on two side walls of a groove opening, so as to gradually enlarge the groove opening. When the first bar portion 511 of the first lock member 51 abuts against the first protrusion 223 of the first cam disk 22, with reference to FIG. 15B, the second lock tooth 512 of the first lock member 51 abuts against the inclined surfaces of the second lock notch 232 of the second cam disk 23, and then the inclined surfaces of the second lock notch 232 of the second cam disk 23 push the first bar portion 511 to move to the proximal end (arrow P), so as to make the first bar portion 511 far away from the first protrusion 223 of the first cam disk 22. When the second lock tooth 512 is separated from the second lock notch 232s corresponding to the initial gear of the second cam disk 23 and located in the groove opening of the second lock notch 232a corresponding to the first bending gear, as shown in FIG. 15D, the first bar portion 511 of the first lock member 51 collides and makes contact with the first protrusion 223 of the first cam disk 22 at this time, and a sound is generated to remind an operator that the gear has been switched.

In order to optimize the use experience of the bending operation, alternatively, as shown in FIG. 6, the second lock notch 232 of the second cam disk 23 of the articulating mechanism 20 comprises a linear section close to a groove bottom and a slope section formed on the linear section and located in the groove opening, and the arrangement of the slope section plays a role in guiding the second lock tooth 512 of the first lock member 51 to pass over the second tooth 231 of the second cam disk 23.

Similarly, the lock groove 321 of the joint member 32 of the joint assembly 30 also comprises a linear section and a slope section located in the groove opening.

As a modified embodiment, the above articulation band 42 and the rack 41 may be replaced by a gear set, and a gear is also arranged on the joint member 32, so that the transmission gear 24 is connected with the joint member 32 through step-by-step meshed transmission of the gear.

The surgical instrument 100 in the above embodiment of the present application comprises the first lock member 51 for selectively locking the bending operation of the articulating mechanism 20 under an operation of the articulating mechanism 20 and the second lock member 52 for selectively locking the position of the joint assembly 30 under an operation of the handle portion 80, so that the surgical instrument locks the position of the joint assembly 30 when the jaw is closed, thus avoiding shaking at a joint when the surgical instrument 100 executes a firing or resetting operation. Meanwhile, during the bending operation, the end effector 70 may be locked at a set angle by operating the articulating mechanism 20.

In the surgical instrument 100 in the above embodiment of the present application, because the transmission hole 322 of the joint member 32 is arranged distally from the aperture 324, the end effector 70 can be articulated to reach the articulated angle of 0° to 70°, which is much larger than a articulated angle of a common surgical instrument in the related art.

The surgical instrument provided in the present application is configured to respectively lock the articulating mechanism and the joint assembly from being operated to articulate through the lockout assembly, wherein the joint assembly can be locked or released by operating the handle portion, so that the joint assembly can be locked from being articulated when it is closed, improving stability of the end effector in the closed state.

The surgical instrument provided by the present application has the second lock member for operatively locking the position of the joint assembly under the operation of the handle portion, wherein the second lock member moves synchronously or substantively synchronously with the outer tube of the elongated shaft. Therefore, the joint assembly is synchronously locked after the end effector completes a closing operation, so as to avoid the end effector from shaking under an interference of an external force.

What is claimed is:

1. A surgical instrument, comprising:
    an end effector adapted for operating tissue, having an open state for receiving the tissue and a closed state for stapling the tissue;
    a handle portion adapted for operatively providing an opening driving force for opening the end effector or a closing driving force for closing the end effector;
    an elongated shaft extending distally from the handle portion, and having a longitudinal axis, wherein the elongated shaft is adapted to transmit the driving force from the handle portion to the end effector;
    a joint assembly respectively connected with the end effector and the elongated shaft;
    an articulating mechanism adapted for operatively providing articulation driving force to the joint assembly, so as to articulate the end effector relative to the longitudinal axis of the elongated shaft; and
    a lockout assembly, comprising:
        a first lock member adapted for selectively locking the articulating mechanism from being operated to articulate; and
        a second lock member adapted for selectively locking a position of the joint assembly under an operation of the handle portion.

2. The surgical instrument according to claim 1, wherein the second lock member is arranged to lock the joint assembly when the handle portion is operated to provide the closing driving force to the end effector; and to release the joint assembly when the handle portion is operated to provide the opening driving force to the end effector.

3. The surgical instrument according to claim 1, wherein the elongated shaft comprises an outer tube, and the second lock member is engaged with the outer tube, so that the second lock member moves synchronously or substantially synchronously with the outer tube.

4. The surgical instrument according to claim 3, wherein a support is arranged inside a distal portion of the outer tube, a slider is slidably connected to the support, the slider is connected with the outer tube through an inserting fitting portion, and the second lock member is connected with the slider directly or through a first biasing member.

5. The surgical instrument according to claim 3, wherein the outer tube is operated to move distally along the longitudinal axis under an action of a closing mechanism; and to move proximately along the longitudinal axis under an action of an opening mechanism.

6. The surgical instrument according to claim 5, wherein the closing mechanism comprises:
    a closure trigger arranged to be operatively rotated about a pivot pin, and having a closed position and an unlocked position, wherein a plurality of first transmission teeth are arranged on the closure trigger;
    a closing transmission member provided with a plurality of second transmission teeth are engaged with the first transmission teeth, which is slidably received within a frame extending along the longitudinal axis; and
    a coupling member adapted for coupling the closing transmission member with the outer tube; and
    when the closure trigger is operated, the closing transmission member is actuated to move distally along the frame, so as to actuate the outer tube to move distally.

7. The surgical instrument according to claim 6, wherein the opening mechanism comprises:

an opening button arranged to operatively rotate about a pivot pin, wherein the opening button is provided with an opening lock portion adapted to be engaged with the closure trigger; and
    a second biasing member arranged between the closing transmission member and the frame, adapted for biasing the closing transmission member at the proximal end thereof; and
    when the opening button is triggered, the opening lock portion release of the closure trigger from the closed position, and is biased to move proximately by the second biasing member, so that the outer tube is actuated to move proximately.

8. The surgical instrument according to claim 1, wherein the joint assembly comprises a joint member, a lock groove is arranged on the joint member, and the lock groove is operated to be engaged with the second lock member to lock the position of the joint assembly.

9. The surgical instrument according to claim 1, wherein the first lock member comprises a first bar portion and a second lock tooth which are respectively engaged with the articulating mechanism, wherein the first bar portion is operatively engaged with the articulating mechanism to release the articulating mechanism from being locked by the second lock tooth.

10. The surgical instrument according to claim 9, wherein the articulating mechanism comprises a first cam disk, a second cam disk and an articulation knob for actuating the first cam disk and the second cam disk to rotate, wherein the first cam disk is operatively engaged with the first bar portion of the first lock member, the second cam disk is operatively engaged with the second lock tooth of the first lock member; and the first cam disk is operated by the articulation knob so as to actuate the first bar portion of the first lock member to disengage the second lock tooth of the first lock member from the second cam disk.

11. The surgical instrument according to claim 10, wherein the first cam disk is provided with a plurality of first lock notches adapted to be engaged with the first bar portion of the first lock member, and the second cam disk is provided with a plurality of second lock notches adapted to be engaged with the second lock tooth of the first lock member.

12. The surgical instrument according to claim 10, wherein the first cam disk is stacked on the second cam disk and is allowed to be rotated with respect to the second cam disk for a certain angle; wherein the first bar portion and the second lock tooth are arranged on the first lock member so as to be aligned with the first cam disk and the second cam disk respectively.

13. The surgical instrument according to claim 10, wherein the articulating mechanism further comprises a first member engaged with the articulation knob and the first cam disk respectively, so as to operatively drive the first cam disk to rotate.

14. The surgical instrument according to claim 10, wherein the articulating mechanism further comprises a transmission gear coaxially and fixedly engaged with the second cam disk, wherein the transmission gear is operatively to be engaged with a articulating transmission assembly to articulate the joint assembly.

15. The surgical instrument according to claim 14, wherein the articulating transmission assembly comprises a rack engaged with the articulating mechanism and an articulation band, a proximal end of the articulation band is engaged with the rack, and a distal end of the articulation band is hinged to the joint member of the joint assembly.

16. The surgical instrument according to claim 14, wherein the joint member is provided with an aperture and a transmission hole, wherein the aperture is adapted to receive the pivot, allowing the joint member to be pivotally engaged with the elongated shaft, and the transmission hole is engaged with the articulating transmission assembly so as to be actuated to articulate the joint assembly; wherein an axis of the transmission hole is arranged distally from an axis of the aperture.

17. The surgical instrument according to claim 16, wherein the articulation band of the articulating transmission assembly is pivotally received within the transmission hole.

18. A surgical instrument, comprising:
- a handle portion;
- an elongated shaft extending distally from the handle portion, wherein the elongated shaft has a longitudinal axis;
- a joint assembly respectively engaged with a distal end of the elongated shaft and a proximal end of an end effector that is operative to be actuated by an articulating mechanism to pivot away from the longitudinal axis of the elongated shaft; and
- a lock member adapted to be actuated by the handle portion so as to operatively lock a position of the joint assembly, wherein the lock member is actuated to move synchronously or substantially synchronously with an outer tube of the elongated shaft.

19. The surgical instrument according to claim 18, wherein the lock member is arranged to be operatively reciprocated, so that when closing driving force is provided from the handle portion to the end effector, the lock member is actuated to lock the position of the joint assembly; and when opening driving force is provided from the handle portion to the end effector, the lock member is actuated to release the joint assembly.

20. The surgical instrument according to claim 18, further comprising:
- an articulating mechanism adapted to operatively provide articulation driving force to the joint assembly, so as to articulate the end effector relative to the longitudinal axis of the elongated shaft; and
- a lockout assembly comprising another lock member that is adapted to operatively lock the articulating mechanism from being articulated.

* * * * *